United States Patent
Nadig et al.

(10) Patent No.: US 10,276,067 B2
(45) Date of Patent: Apr. 30, 2019

(54) ELECTRIC MOTOR CONSTRUCTION KIT AND ELECTRIC MOTOR

(71) Applicant: Robert Bosch GmbH, Stuttgart (DE)

(72) Inventors: Peter Nadig, Goennheim (DE); Peter Stierle, Pliezhausen (DE); Joerg Maute, Sindelfingen (DE); Ortwin Elsaesser, Schwieberdingen (DE)

(73) Assignee: Robert Bosch GmbH, Stuttgart (DE)

(*) Notice: Subject to any disclaimer, the term of this patent is extended or adjusted under 35 U.S.C. 154(b) by 753 days.

(21) Appl. No.: 14/753,633

(22) Filed: Jun. 29, 2015

(65) Prior Publication Data

US 2015/0379897 A1 Dec. 31, 2015

(30) Foreign Application Priority Data

Jun. 30, 2014 (DE) .................. 10 2014 212 566

(51) Int. Cl.
*G09B 23/18* (2006.01)

(52) U.S. Cl.
CPC .................. *G09B 23/188* (2013.01)

(58) Field of Classification Search
CPC .................................................. G09B 23/188
See application file for complete search history.

(56) References Cited

U.S. PATENT DOCUMENTS

| | | | | |
|---|---|---|---|---|
| 2,949,680 A | * | 8/1960 | Black ............... | G09B 23/188 310/1 |
| 3,310,886 A | * | 3/1967 | Tudor .............. | G09B 23/188 434/380 |
| 4,136,714 A | | 1/1979 | Jones | |
| 4,267,647 A | * | 5/1981 | Anderson, Jr. ..... | G09B 23/188 434/301 |

FOREIGN PATENT DOCUMENTS

| | | | |
|---|---|---|---|
| CN | 1754298 A | 3/2006 | |
| CN | 201113692 Y | 9/2008 | |
| CN | 101414776 A | 4/2009 | |
| CN | 201766478 U | 3/2011 | |
| DE | 1 944 660 A1 | 3/1971 | |
| DE | 2 042 012 A1 | 3/1972 | |
| DE | 10 2007 005 330 A1 | 7/2008 | |
| DE | 10 2013 210 971 A1 | 12/2014 | |
| GB | 1468573 A * | 3/1977 | ............ G09B 5/067 |
| JP | 2000110895 A | 4/2000 | |

* cited by examiner

*Primary Examiner* — Mohamad A Musleh
(74) *Attorney, Agent, or Firm* — Maginot, Moore & Beck LLP

(57) ABSTRACT

An electric motor construction kit for assembling a plurality of electric motors includes at least one module and a plurality of assemblies for constructing the plurality of electric motors. At least one assembly of the plurality of assemblies includes one or more modules of the at least one module. Apart from a cooling system of an electric motor of the plurality of electric motors, each module of the at least one module is constructed from carry-over parts.

16 Claims, 12 Drawing Sheets

ELECTRIC MOTOR CONSTRUCTION KIT AND ELECTRIC MOTOR

This application claims priority under 35 U.S.C. § 119 to patent application no. DE 10 2014 212 566.9, filed on Jun. 30, 2014 in Germany, the disclosure of which is incorporated herein by reference in its entirety.

The disclosure relates to an electric motor construction kit for assembling a plurality of electric motors, in particular for assembling at least two configurations or types of preferably electronically commutatable electric motors. In addition, the disclosure relates to an electric motor or electric motors of different types, in particular an electronically commutatable electric motor or electronically commutatable electric motors of different types, preferably a full-cartridge motor and/or a half-cartridge motor. Furthermore, the disclosure relates to a handheld electric tool, an electromechanical tool or an electric drive comprising an electric motor according to the disclosure consisting of the electric motor construction kit according to the disclosure.

BACKGROUND

Electric motors or electric motor (auxiliary) drives are known from the prior art which are used, for example, as drive motors for handheld electric tools or electromechanical tools or, for example, as servo drives for windshield wipers, windows, seats, pumps, etc. of vehicles. Such electric motors are usually in the form of brushless electronically commutated electric motors having a stator. The stator can be constructed by punching and stacking from individual sheet-metal laminations and in each case one end lamination or plate, which is usually manufactured from plastic. End caps are located at the longitudinal ends of the stator, which end caps are used for bearing a rotor (internal rotor) and possibly for accommodating sensors (sensors, incremental encoders) for determining a rotor position, electrical connections and other components.

The electric motor can be in the form of a so-called full-cartridge motor having a closed frame or in the form of a so-called open-frame motor having an open frame. In the first case, the rotor is mounted on both sides in a housing of the electric motor. In the second case, the rotor is mounted directly in housing parts of a product. The housing of the electric motor in this case does not perform any tasks involved in the mounting of the rotor; this is performed by the housing parts of the product.

Furthermore, various concepts for cooling electric motors are known. In the sector of electric tools, typically primarily air cooling is used, wherein there are different possibilities for cooling the electric motor. These possibilities are firstly cooling exclusively over an outer geometry of the electric motor (closed motor); secondly cooling over the outer geometry and the stator windings and/or the slots of the stator of the electric motor (open motor), wherein the rotor is encapsulated and is therefore not in the air flow; and thirdly a (completely) open electric motor (likewise open motor) in which the rotor and the stator are in the air flow.

In the sectors of handheld electric tools, electromechanical tools, electric drives, etc., in each case a multiplicity of different full-cartridge and/or open-frame motors are required which, owing to a different size, different power requirements and/or different possibilities for air cooling (use sector of the electric motor), have a comparatively large degree of variance in terms of their individual parts. As a result, the use of identical electric motors for different requirements, for example in different tools or drives, is very restricted. That is to say that it is necessary for a special electric motor to be used for a respective tool or drive type.

A problem consists in specifying an improved electric motor, wherein a proportion of its individual parts can be used for a multiplicity of electric motors. In addition, a problem consists in specifying a construction kit for producing a multiplicity of electric motors for handheld electric tools, electromechanical tools and/or electric drives, etc. Furthermore, a problem consists in specifying a correspondingly improved handheld electric tool, a correspondingly improved electromechanical tool and/or a correspondingly improved electric drive. In this case, the electric motor according should be constructed simply and should be capable of production, assembly and maintenance at low cost.

SUMMARY

The problem of the disclosure is solved by means of an electric motor construction kit for assembling a plurality of electric motors, in particular for assembling at least two configurations or types of preferably electronically commutatable electric motors; by means of an electric motor or by means of electric motors of different types, in particular an electronically commutatable electric motor or electronically commutatable electric motors of different types, preferably a full-cartridge motor and/or a half-cartridge motor; and a handheld electric tool, an electromechanical tool or an electric drive, in particular an electric screwdriver, an electric drill, an electric saw, an electric grinding machine or an electric garden appliance. Advantageous developments, additional features and/or advantages of the disclosure are set forth in the dependent claims and the description below.

The electric motor construction kit for assembling a plurality of electric motors according to the disclosure comprises at least one module and a plurality of assemblies for constructing the electric motors, wherein at least one assembly of the electric motor construction kit has at least one module of the electric motor construction kit, and, preferably apart from a cooling system of an electric motor, all of the modules of the electric motor construction kit are constructed from carry-over parts. That is to say that the at least one assembly can comprise one, two, three or more modules, which are each constructed from carry-over parts. In this case, a plurality of assemblies can also have only one module. In addition, it is possible for an assembly to be identical to a module, wherein in such a case the assembly is constructed exclusively from carry-over parts.

Preferably, apart from a cooling system, all of the modules of the electric motor construction kit are substantially identical for all of the configurations or types of electric motors which can be constructed from the electric motor construction kit, wherein preferably also any module of the electric motor construction kit can be used for any configuration or any type of the electric motors which can be constructed by means of the electric motor construction kit. That is to say that all of the different modules provided in the electric motor construction kit are installed in all of the electric motors which can be constructed from the electric motor construction kit.

In embodiments of the disclosure, the at least one assembly of the electric motor construction kit, apart from one module of the electric motor construction kit, can have at least one individual part for at least one specific configuration or one specific type of an electric motor, wherein the individual part, together with the module, forms the assembly. The electric motor construction kit can be configured in such a way that a non-output drive side of all of the electric motors that can be constructed thereby are formed so as to be substantially identical, and/or the electric motor construction kit can be configured in such a way that an output drive side of substantially all of the electric motors that can be constructed thereby is designed in such a way that in this case a multiplicity of individual parts of the configurations or the types of electric motors is provided.

In some electric motors, the non-output drive side is also referred to as the sensor side and is diametrically opposite the output drive side, i.e. forms a longitudinal end section of the electric motor which is opposite the output drive side in the longitudinal direction.—Electric motor construction kit according to one of the preceding claims, characterized in that the at least one module of the electric motor construction kit is a frame module for mounting an armature shaft of the electric motor, wherein the frame module is preferably designed in such a way that both an armature shaft of a first configuration or a first type of electric motor and an armature shaft of a second configuration or a second type of electric motor can be mounted by means of the frame module.

That is to say that the electric motors are configured by means of the electric motor construction kit in such a way that, in particular in all configurations or types of electric motors, all armature shafts can be mounted in the electric motor by means of a single frame module, which relates to, for example, a full-cartridge motor, also referred to as full-cartridge design or closed-frame concept, as well as a half-cartridge motor, also referred to as half-cartridge design or (semi-)open-frame concept. That is to say that in particular the frame module is the same for all electric motors from the electric motor construction kit.

Thus, the electric motor construction kit can also have, as modules, a rotor module, a stator module and/or a fastening module, wherein any electric motor that can be constructed by means of the electric motor construction kit has the rotor module, the stator module and/or the fastening module.—In this case, the rotor module can comprise a rotor body, a magnet and/or a balancing disk. The stator module can have a stator body, a winding having slot insulation, an end plate, a connecting plate, an electrical connection, a connection for radio interference suppression and/or possibly a slot seal. The frame module can have an end cap, an armature bearing, a cap, a magnet wheel, a sensor circuit board and/or possibly an end cap having an opening for cooling, and the fastening module can comprise a tensioning element, a force introduction element, a ring and/or possibly a ring having an opening for cooling.

For cooling an electric motor, possibly a changed end cap having an opening can be used as carry-over part in the frame module, possibly a changed ring having an opening can be used as carry-over part in the fastening module and/or possibly a changed end cap having an opening can be used as individual part, wherein the stator module can have a slot seal. In accordance with the disclosure, a configuration of the electric motor may be a full-cartridge (electric) motor. In addition, one configuration of the electric motor may be a half-cartridge (electric) motor. Furthermore, the non-output drive side may be a sensor side of the electric motor in some electric motors.

An electric motor according to the disclosure or the electric motors of different types according to the disclosure has a frame module or each have a frame module consisting of an electric motor construction kit, wherein the frame module of the electric motor is suitable for a second electric motor of a different type or the electric motors of different types have substantially identical frame modules. In accordance with the disclosure, an armature shaft of the/a full-cartridge (electric) motor can be mounted in the full-cartridge motor on both sides. In addition, an armature shaft of the/a half-cartridge (electric) motor can be mounted only on one side in the half-cartridge motor. Preferably, the frame module is in the form of a stator end cap module, and in addition the electric motor can be produced using an electric motor construction kit according to the disclosure.

The handheld electric tool, such as, for example, a handheld machine tool/handheld machine, the electromechanical tool, such as a machine tool, for example, or the electric drive, such as, for example, a servo drive, a stepper motor or an electric drive, has an electric motor according to the disclosure. In this case, the tool, the machine or the drive can be mains-operated or operated on a rechargeable battery or battery. Quite generally, the electric tool, the electromechanical tool or the electric drive can be used, for example, in the sectors of concrete, metal, plastics, wood, ground/grass, water, automation, automotive, household, etc.

That is to say that the disclosure can be used, for example, for screwdrivers, drills, hammers, saws, milling machines, planes, grinding machines, scrapers, nibblers, shears, multifunctional appliances, nail drivers, tackers, pumps, high-pressure cleaners, vacuum cleaners, fans, garden appliances (chainsaws, wood/branch/hedge/grass clippers and shears, chippers, scythes, lawnmowers, cultivators, pressure-spraying devices, etc.), electricity generators, etc. which are operated by electric motor. The tool in question can in this case be a portable, i.e. a preferably handheld, or a stationary tool. In addition, the disclosure can be used for machines, vehicles, bicycles, automated machines, robots, household appliances, fans, toys, electric appliances, electronic appliances (computers, hard disks, players, etc.) etc.

BRIEF DESCRIPTION OF THE DRAWINGS

Additional disclosure is provided below using exemplary embodiments with reference to the attached schematic drawing, which is not true to scale. Elements or component parts which have an identical univocal or similar design and/or function are provided with the same reference symbols in the description and in the list of reference symbols and/or are characterized by the same reference symbols in the figures in the drawing. Possible alternatives which are not explained in the description, are not illustrated in the drawing and/or are not conclusive, steady-state and/or kinematic inversions, combinations, etc. to the embodiments illustrated and/or the explained embodiments of the disclosure or individual assemblies, parts or sections thereof, are set forth in the list of reference symbols.

All of the explained features, even those in the list of reference symbols, can be used not only in the specified combination or the specified combinations, but also in a different combination or different combinations or on their own. In particular, it is possible to substitute a feature or a plurality of features in the description of the disclosure and/or the description of the figures using the reference symbols and the features assigned thereto in the list of reference symbols. In addition, as a result a feature or a plurality of features can be set forth and/or specified in more detail in the claims.—In the figures (FIG.) in the drawing:

DETAILED DESCRIPTION

Figure 1:
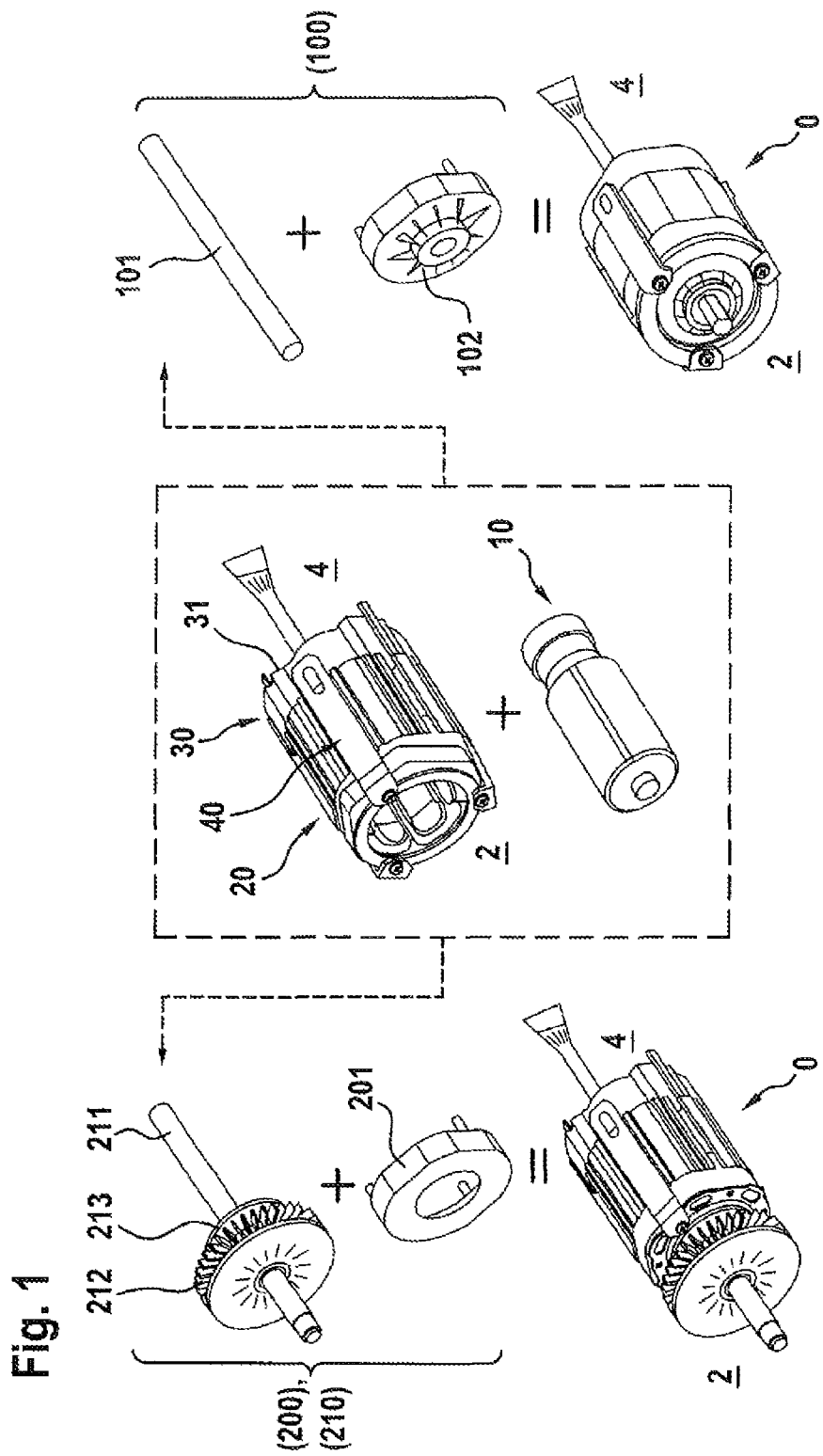
FIG. 1 shows a plurality of perspective views of an overview of carry-over parts and individual parts from a construction kit according to the disclosure for at least two configurations of an electric motor according to the disclosure.

By virtue of a fixedly defined design of an electric motor either as a full-cartridge motor or an open-frame motor and fixedly defined guidance of an air flow at/through the electric motor, the use of the same electric motor for different requirements, for example in different types of tools, is restricted. That is to say that a specific electric motor needs to be used for a respective type of tool. For example, in the case of products which are used in a (very) contaminated environment (conductive, magnetic dusts, for example in the case of angle grinders), a closed electric motor, also referred to as a closed motor, is required or at least advantageous.

Owing to the few possibilities for cooling such a closed motor, only a relatively low power of this electric motor can be achieved. If the same electric motor is used in a product which is used in a less contaminated environment (for example in a jig saw) only the relatively low power can again be achieved here, although the same electric motor could achieve a higher power with an open cooling system, i.e. in the form of an open motor. In the case of open cooling, an electric motor for this product could also be constructed to be shorter, for example, as a result of which the product would be less expensive and more compact. Given the same dimensions, furthermore a functional scope of the product could be enlarged.

Even in the case of a decision in favor of a closed or an open design of the electric motor, the requirements are not identical in different products in which the electric motor is intended to be installed. It may be advantageous to mount an armature shaft in a housing of a product since, as a result, an output drive or a transmission can be connected directly to the armature shaft. Thus, for example, a gearwheel can be fitted fixedly on the armature shaft. In other products, it may be advantageous to use a completely mounted electric motor (full-cartridge motor) and to use coupling to the output drive in order to reduce complexity of a housing of the product, for example.

Owing to these different requirements placed on electric motors, a correspondingly large number of differently constructed electric motors result. Owing to a corresponding diversity of parts, the development complexity necessary for this and high tool and production costs, comparatively high costs result for one or a plurality of electric motors.—The disclosure explained in more detail below discloses electric motors with a modular design which can have the above-mentioned different configurations (essentially six basic different configurations are mentioned above) and can be produced by a construction kit according to the disclosure having many possible carry-over parts. Different configurations by means of the construction kit according to the disclosure are of course possible.

In order to be able to use a multiplicity of carry-over parts, in accordance with the disclosure simply an open-frame design of the electric motor is not proposed, but it is envisaged that the electric motor is at least mounted, in particular using rolling-contact bearings, on a non-output drive side for all configurations of the electric motors according to the disclosure. That is to say that a rotor is preferably accommodated or mounted in an end cap for all configurations of the electric motors according to the disclosure, which end cap is located substantially directly on a stator of the electric motor. The non-output drive side is in this case that longitudinal side of the electric motor which is opposite an output drive side. In the embodiments explained further below, the non-output drive side is also a sensor side of the electric motor in question.

A bearing, in particular a rolling-contact bearing, on the output-drive side or a bearing arrangement of the rotor on the output-drive side is in one case preferably accommodated in an end cap of the electric motor. The electric motor is in the form of a full-cartridge motor (closed-frame concept), i.e. both bearing arrangements or bearings are associated with the electric motor, i.e. provided substantially on/in its housing. In another case, the rotor is preferably mounted directly in a housing of the product, for example a transmission housing. The electric motor is in the form of a half-cartridge motor ((semi-)open-frame concept).

As a result, a diversity of parts of the electric motors is reduced, and a sensor-side bearing arrangement, a position sensor system, such as, for example, a magnet wheel for determining the position of the rotor, etc., can in this case be identical for all variants of the electric motors without the advantages of the open-frame design of electric motors being impaired by the rotor being mounted on the transmission side in the product housing.—The following configurations can be realized in accordance with the disclosure using many carry-over parts and by means of few different parts. These configurations are in particular half-cartridge motors having closed cooling, half-cartridge motors having a stator through which a flow passes and half-cartridge motors which have a flow completely passing through. In addition, these are full-cartridge motors with closed cooling, full-cartridge motors with a stator through which a flow passes and full-cartridge motors which have a flow completely passing through.

The advantages of the modular design according to the disclosure are a reduced level of development complexity, as a result of which lower development costs and shorter development times for new variants of the electric motors result. In addition, higher production numbers can be realized with the carry-over parts and thus lower production costs, in particular in the case of products with small production numbers. Furthermore, no or only low tool costs result for new variants of electric motors. Production of different variants of the electric motors on an identical production line or the same manufacturing devices is possible.

The following exemplary embodiments show a possible design for the different configurations of the electric motor. In design terms, the individual components can naturally also have a different construction, possibly in terms of detail. For different power classes, a length of a laminate stack (stator, rotor) can be changed in addition to a modular configuration. As a result, changed cooling areas and different maximum power figures according to standard are achieved. A basic design of the various configurations remains the same even for different motor lengths and many carry-over parts can be used, for example end caps, end plates, sensor circuit boards, magnet wheels, bearings, etc.

FIG. 1 shows an overview of carry-over parts (center) and individual parts (on the left and on the right) for two configurations of an electric motor 0, which is either in the form of a full-cartridge motor 0 (on the right), i.e. with a closed frame, or in the form of a half-cartridge motor 0, i.e. with an open frame ((semi)open-frame concept). For both configurations, in each case the cooling system is illustrated over an outer geometry of the electric motor 0, i.e. the end caps 31, 102; 31, 201 are closed and there is only an external flow around a stator 20.

Figure 9:
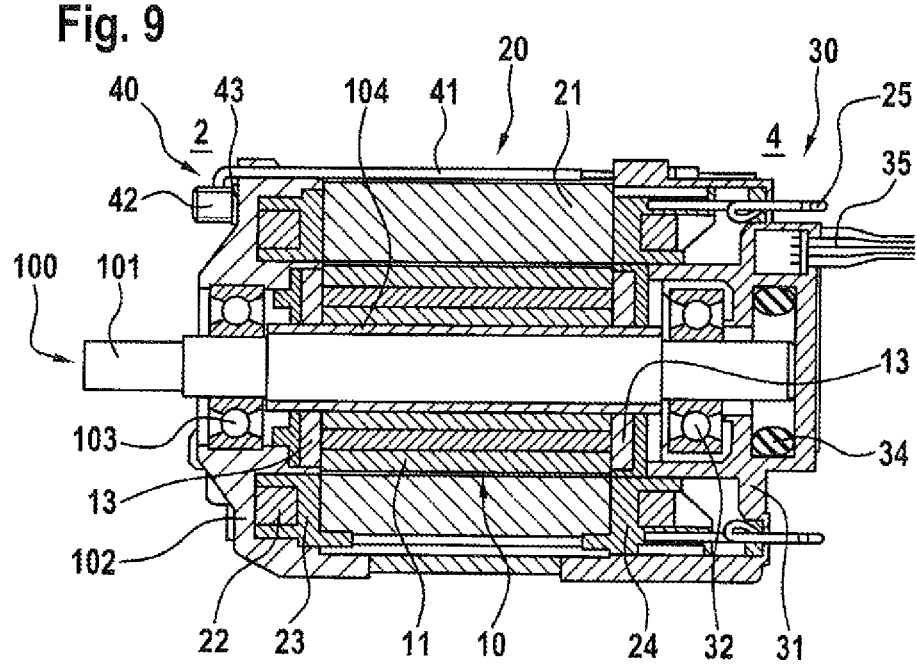
FIG. 9 shows a side view with a central section through the electric motor, which is in the form of a full-cartridge motor according to the disclosure, consisting of the construction kit according to the disclosure.
Figure 13:
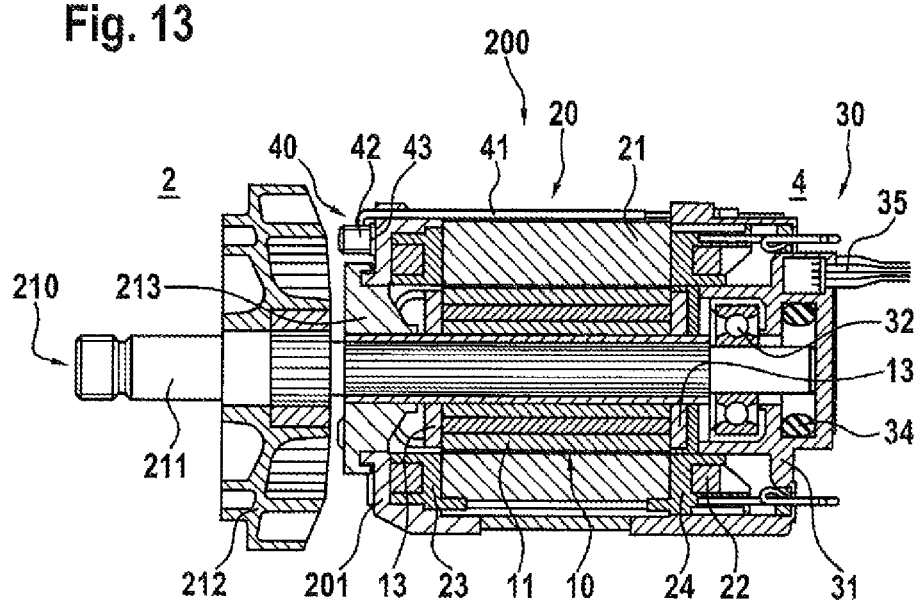
FIG. 13 shows a side view with a central section through the electric motor in the form of a half-cartridge motor according to the disclosure consisting of the construction kit according to the disclosure.

The full-cartridge motor 0 illustrated at the bottom right in FIG. 1 and in FIG. 9 is functional without a further housing; a rotor bearing arrangement is integrated in the end caps 31, 102 and said end caps are fixedly connected mechanically to a fastening device 40.—In the half-cartridge motor 0 illustrated at the bottom left in FIG. 1 and in FIG. 13, a housing of a product is required for complete mounting, i.e. a rotor bearing on the output drive side has a seat in the housing of the product (not illustrated in the drawing). Such an electric motor 0 is only functional to a certain degree without the housing of the product, but is nevertheless referred to as electric motor 0 within the scope of this specification.

FIG. 1 shows an overview of the construction kit according to the disclosure having a modular design of the at least two configurations of electric motors 0, (on the left and on the right) and the carry-over parts (center) of the two configurations.—The carry-over parts relate to the modules 10, 20, 30, 40 of the construction kit according to the disclosure, wherein the carry-over parts are identical for the at least two configurations of the electric motors 0. In addition, the two configurations of the electric motors 0 each preferably comprise at least one individual part, which only belongs to a configuration of an electric motor 0. Such an individual part is an assembly 100; 200, 210 of the electric motor 0 in question and does not belong to a module 10, 20, 30, 40.

Figure 2:
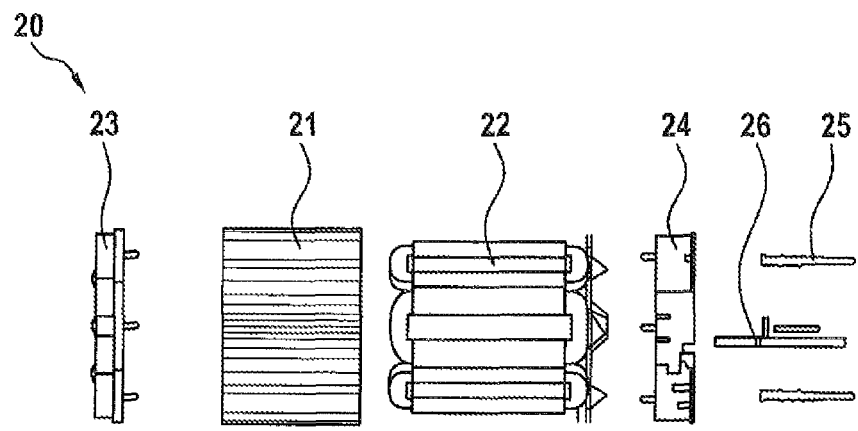
FIG. 2 shows a side view of an exploded illustration of a stator module according to the disclosure consisting of carry-over parts for both configurations of the electric motor.

The carry-over parts used are illustrated below with reference to FIGS. 2 to 6.—FIG. 2 shows (all carry-over parts) a stator 20 or a stator module 20 comprising a connecting plate 24 and an end plate 23, a stator body 21 or a laminate stack 21, winding(s) with slot insulation 22, an electrical connection 25 and a Y connection 25 for radio interference suppression. A winding configuration (wire diameter and turns number) can be matched for different electric motors 0. An alternative and/or additional carry-over part 27 (cf. FIG. 14) or a plurality thereof can of course be used.

Figure 3:
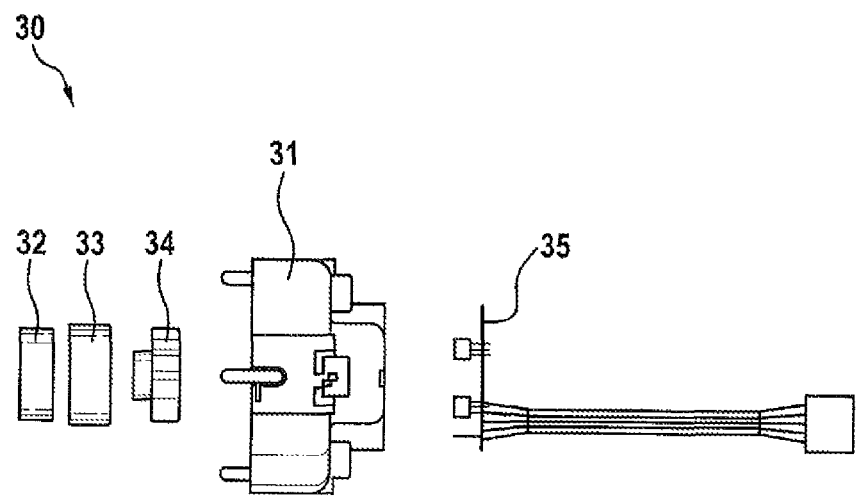
FIG. 3 likewise shows a side view of an exploded illustration of a frame module according to the disclosure consisting of carry-over parts for both configurations of the electric motor.

FIG. 3 shows (all carry-over parts) a frame module 30 or a stator end cap module 30 comprising an end cap 31 or stator end cap 31, a sensor circuit board 35, a magnet wheel 34, a sensor-side armature bearing 32 and a (rubber) cap 33 for mounting. The sensor circuit board 35 comprising preferably Hall sensors is inserted in particular into the end plate 31 during assembly and is fastened by means of being latched in, screwed, hot-stamped or the like. If required, the sensor circuit board 35 can be potted in the end plate 31 in order to protect against external influences (abrasive and/or electrically conductive and/or magnetic dusts, vibrations, etc.). An alternative and/or additional carry-over part 36 (cf. FIG. 14) or a plurality thereof can of course be used.

Figure 4:
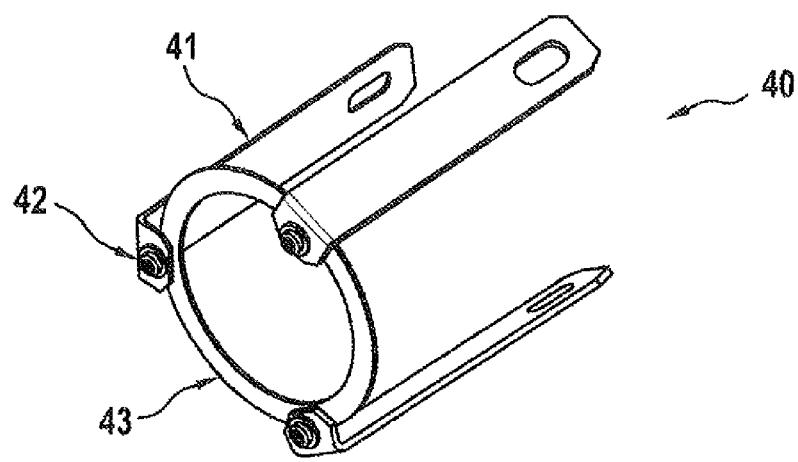
FIG. 4 shows a perspective view of a fastening module according to the disclosure consisting of carry-over parts for both configurations of the electric motor.

FIG. 4 shows (all carry-over parts) a fastening module 40 comprising tensioning elements 41 or struts 41 for connecting two end caps 31 (102, 201), wherein one of these end caps is the end cap 31. In the embodiment illustrated, a tensioning element 41 is illustrated as a sheet-metal bent part 41. Other connecting elements, for example a round material (spoke), a threaded rod, a cable (metal, plastic), etc. are also conceivable. The tensioning elements 41 are suspended in each case on the sensor-side end cap 31 and are pretensioned by a force introduction element 42, in particular a screw 42, against an opposite end cap (102, 201). In order that a free screw end does not damage the end cap (102, 201) consisting of plastic, a ring 43, in particular a sheet-metal ring 43, or a plain washer can be laid underneath. An alternative and/or additional carry-over part 44 (cf. FIG. 14) or a plurality thereof can of course be used.

Figure 5:
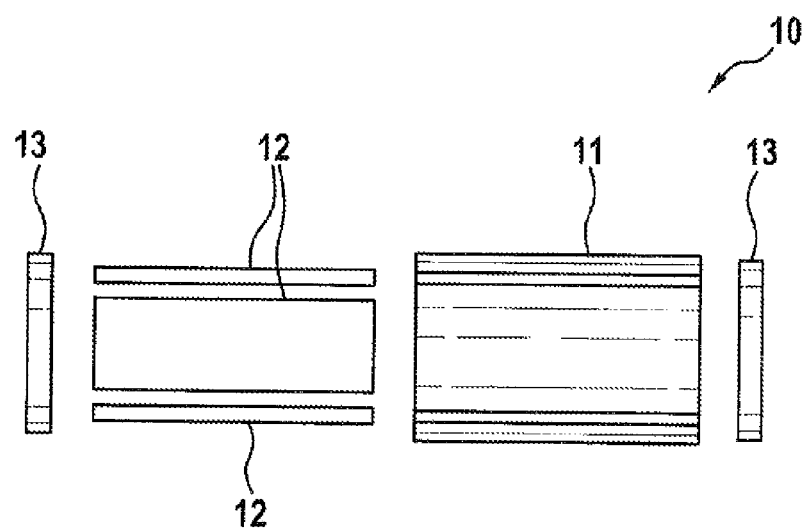
FIG. 5 shows a side view of an exploded illustration of a rotor module according to the disclosure consisting of carry-over parts for both configurations of the electric motor.
Figure 6:
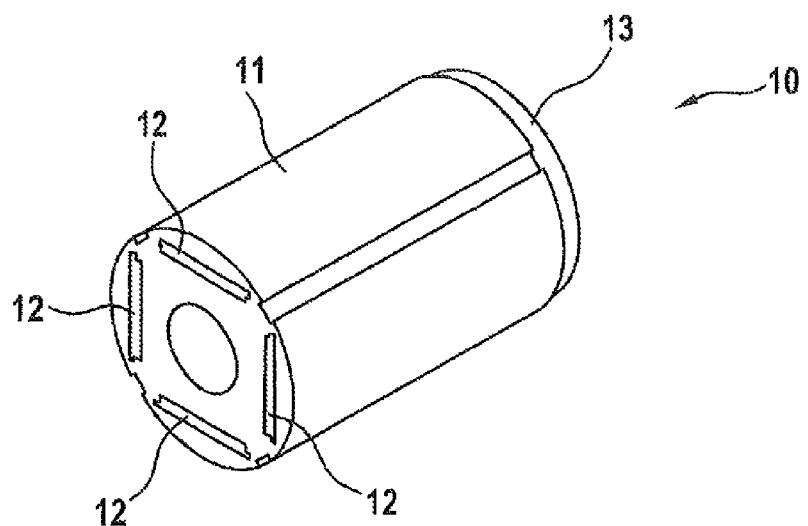
FIG. 6 shows an assembly view of the rotor module shown in FIG. 5, wherein a balancing disk of the rotor module has been omitted.

FIG. 5 shows (all carry-over parts) a rotor module 10 comprising a rotor body 11 or a laminate stack 11, magnets 12, wherein preferably four magnets 12 are provided for each laminate stack 11 and in each case one balancing disk 13 at the front ends of the laminate stack 11. The laminate stack 11 with its magnets 12 and balancing disks 13 can be pressed directly onto a rotor shaft (101, 211) or armature shaft (101, 211) with corresponding insulating layer (104, 214) (according to standard). The armature shaft (101, 211) and the insulation (104, 214) thereof are not illustrated since they are correspondingly different to a motor variant (see below). An alternative and/or additional carry-over part 14 (cf. FIG. 14) or a plurality thereof can of course be used. FIG. 6 shows an assembled rotor module 10, with a balancing disk 13 missing at the front.

Figure 7:
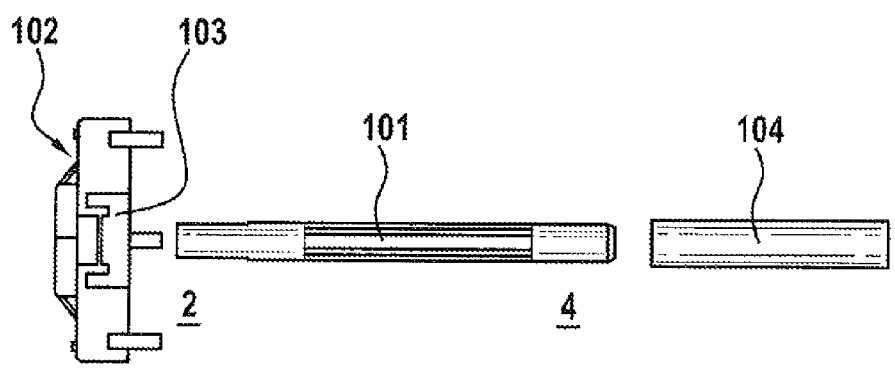
FIG. 7 shows a side view of an exploded illustration of the individual parts for a configuration of the electric motor according to the disclosure as a full-cartridge motor.
Figure 8:
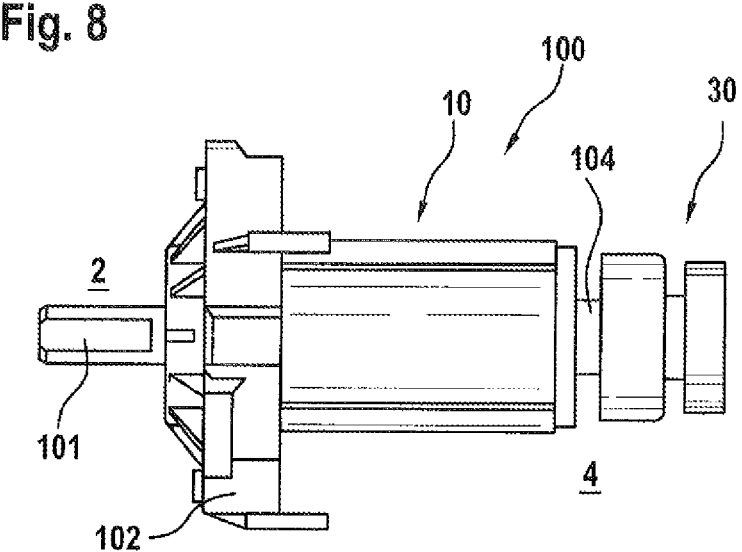
FIG. 8 shows a side view of an assembled illustration of an armature shaft assembly according to the disclosure including the rotor module shown in FIG. 6 for the full-cartridge motor.

In order to construct various configurations of the electric motor 0 with the abovementioned components, corresponding different components are required for an output drive side 2 of the electric motor 0.—Such an assembly 100 in the form of an armature shaft assembly 100 is explained in more detail below for a full-cartridge motor 0 in the form of the first configuration (cf. FIGS. 9 and 14), wherein FIGS. 7 and 8 show components for a further design of the full-cartridge motor 0. An insulator 104 in the form of an individual part for the laminate stack 11 of the rotor module 10 is illustrated here as a "tube" insulation, which is pressed, in composite form with the rotor module 10 (cf. FIGS. 1, 5 and 6), onto an armature or rotor shaft 101. The insulator 104 can also be designed as a carry-over part (see below).

It is also possible for the armature shaft 101 to be encapsulated by injection molding with an insulating material, wherein the rotor module 10 is accommodated in an injection-molding encapsulating die and is thus fixed by the encapsulation by injection molding. In the end cap 102 illustrated (individual part), an armature bearing 103 (individual part) is preferably injection-molded or assembled in another way, for example adhesively bonded, clamped, etc. The armature bearing 103 with the end cap 102 is pressed onto the armature shaft 101. This complete armature shaft assembly 100 (see FIG. 8) is then pushed into the stator module 20 (see FIG. 1) and then the end caps 31, 102 are connected by the fastening module 40 (see FIG. 4). FIG. 9 finally shows a completely assembled electric motor 0 in the form of a full-cartridge motor 0, in section. An alternative and/or additional individual part 105 (cf. FIG. 14) or a plurality thereof can of course be used.

Figure 10:
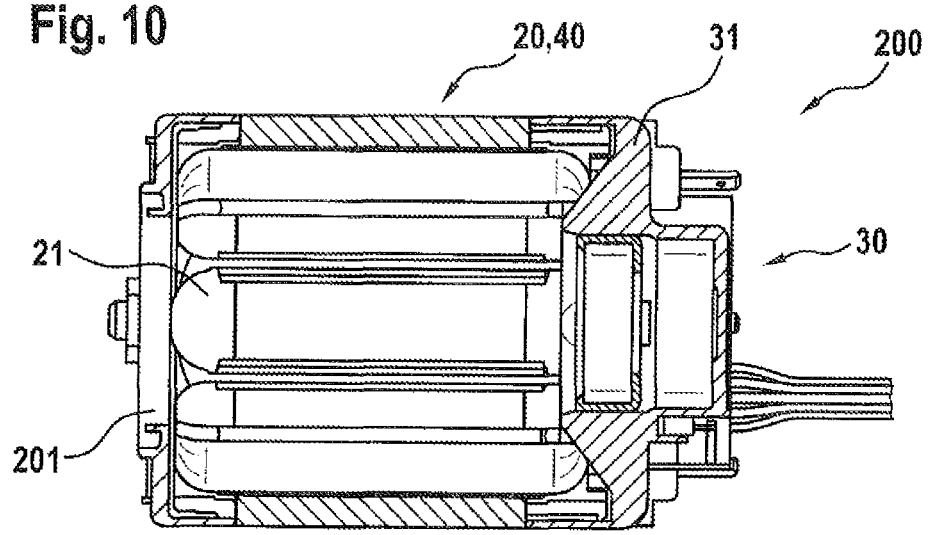
FIG. 10 shows a side view of an assembled illustration of a stator assembly according to the disclosure including the stator module and the frame module.
Figure 11:
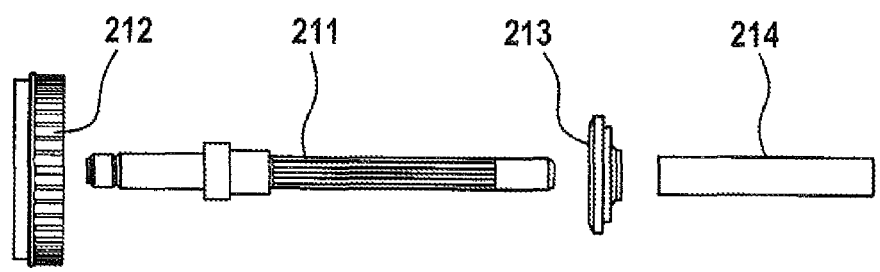
FIG. 11 shows a side view of an exploded illustration of the individual parts for a configuration of the electric motor according to the disclosure as a half-cartridge motor.

A second configuration of the electric motor 0 according to the disclosure is explained in more detail below, wherein the electric motor 0 is designed as a half-cartridge motor 0 (cf. FIG. 13 and FIG. 14). In this configuration, a housing of a product is also required for a complete design of the electric motor 0, which housing accommodates an armature bearing on the output drive side. These housing parts and the armature bearing are not illustrated in the drawing. In this configuration, the stator module 20 is preassembled to form the stator assembly 200 by virtue of a front end cap 201 being connected via the fastening module 40 to the sensor-side end cap 31 or the frame module 30 (cf. FIG. 10). An alternative and/or additional individual part 202 (cf. FIG. 14) or a plurality thereof can of course be used.

Figure 12:
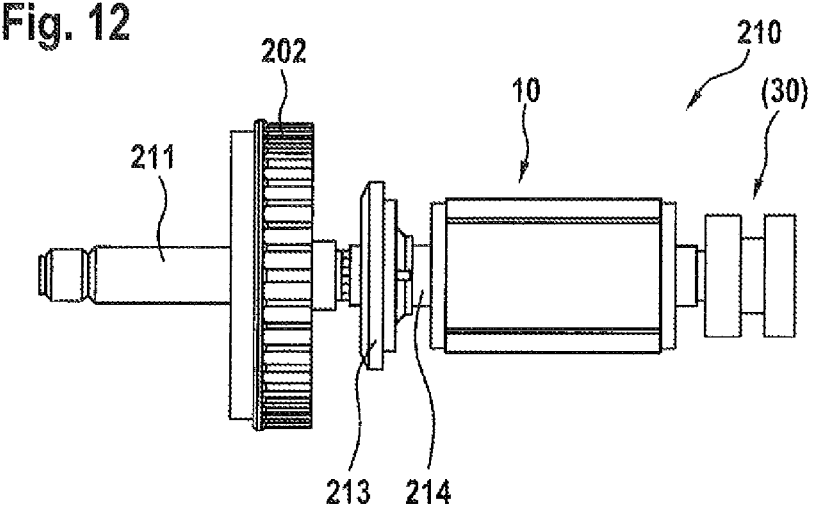
FIG. 12 likewise shows a side view of an assembled illustration of an armature shaft assembly according to the disclosure including the rotor module shown in FIG. 6 for the half-cartridge motor.

An armature shaft assembly 210 (see FIG. 12) is constructed for the half-cartridge motor 0 from a product-specific armature shaft 211, i.e. an armature shaft which is designed as an individual part, a fan 212 (individual part) and an insulator 214 (individual part). The insulator 214 can in this case also be pressed on in composite form or the armature shaft 211 can be encapsulated by injection molding (see also above). In addition, the insulator 214 can have the same design as the insulator 104 (carry-over part).

A labyrinth disk 213 (individual part) which has been pressed onto the armature shaft 211 and forms a circumferential tongue-and-groove geometry with respect to the end cap 210 (see FIG. 13), is proposed as a sealing element 213 (individual part). Other sealing elements 213, such as, for example, a shaft sealing ring (individual part) (not illustrated in the drawing) in the end cap 201, are also conceivable. FIG. 13 finally shows a completely assembled electric motor 0 in the form of a half-cartridge motor 0, in section, with a sensor-side armature bearing 32 in the end cap 31 and a fan-side armature bearing (not illustrated) in the housing of the product. An alternative and/or additional individual part 215 (cf. FIG. 14) or a plurality thereof can of course be used.

Figure 14:
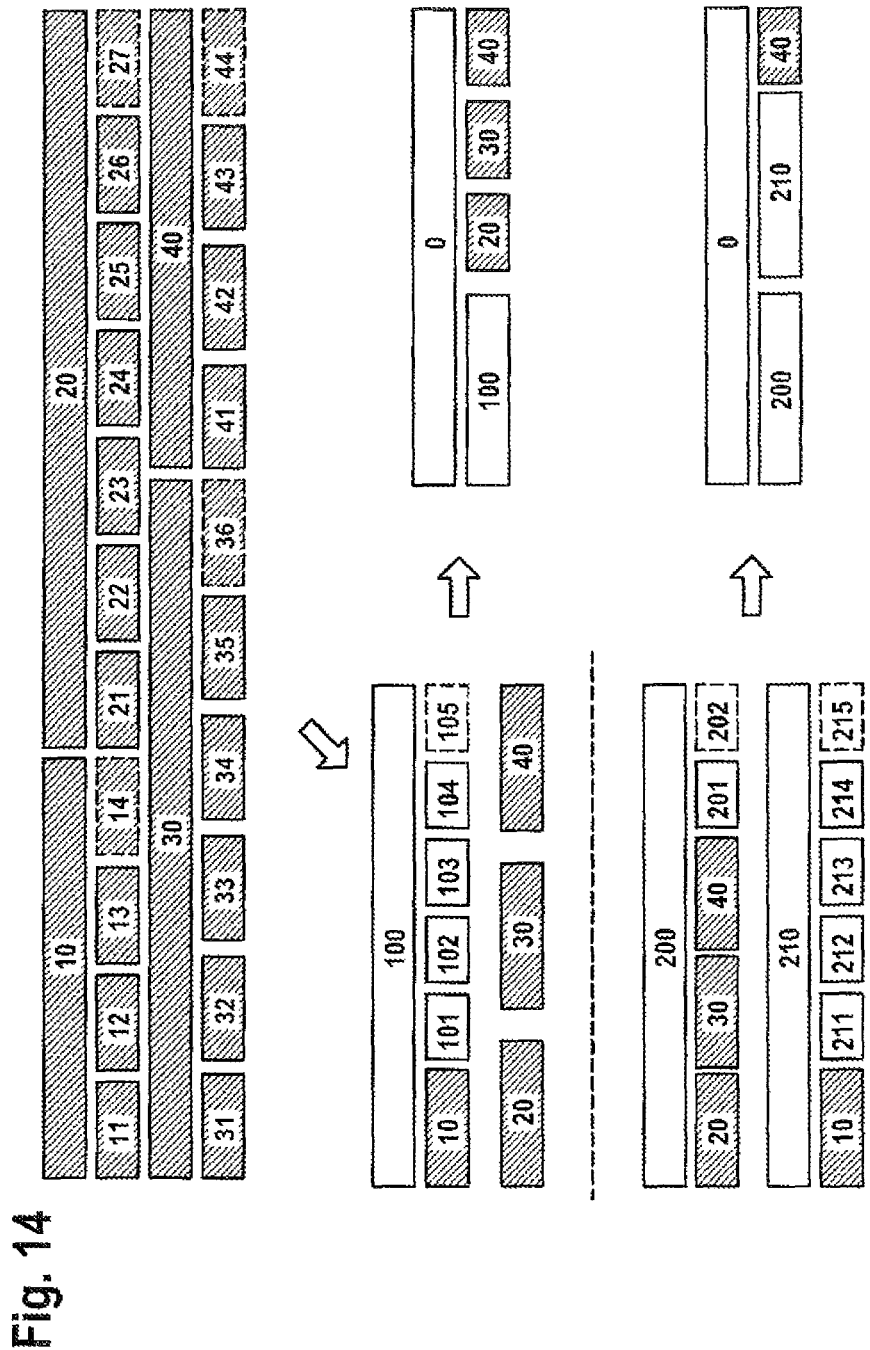
FIG. 14 shows an overview diagram using the reference symbols of the construction kit according to the disclosure showing how the modules are divided into carry-over parts and the assemblies are divided into modules and individual parts.

FIG. 14 elucidates schematically, using the reference symbols (cf. also the list of reference symbols) how the two configurations of the electric motor 0 according to the disclosure are constructed from the carry-over parts (highlighted in gray or hatched) and the individual parts. The comparatively high number of carry-over parts for two configurations of the electric motor 0 can be seen easily. The component parts 14, 27, 36, 44, 105, 202, 215 in this case represent an alternative and/or an additional component part, wherein naturally also fewer or more than the illustrated component parts can be installed per module 10, 20, 30, 40 or assembly 100; 200, 210. In addition, a number and/or a design of the respective module 10, 20, 30, 40 or a respective assembly 100; 200, 210 can vary.

Starting with the carry-over parts 11, 12, 13(,14), the carry-over parts 21, 22, 23, 24, 25, 26(,27), the carry-over parts 31, 32, 33, 34, 35(,36) and the carry-over parts 41, 42, 43(,44), the modules 10, 20, 30, 40 (at the top in FIG. 14) result. A number and/or a design of the carry-over parts and/or a number and/or a design of the modules can naturally be different in each case.—For the full-cartridge motor 1 (in the center in FIG. 14), the module 10 is grouped with the individual parts 101, 102, 103, 104(,105) to form the assembly 100, which for its part, together with the modules 20, 30, 40, constructs the full-cartridge motor 1.—For the half-cartridge motor 1 (at the bottom in FIG. 14), the modules 20, 30, 40 are grouped with the individual parts 201(,202) to form the assembly 200, and the module 10 is grouped with the individual parts 211, 212, 213 214(,215) to form the assembly 210, wherein the two assemblies 200, 210 construct the half-cartridge motor 1.

Figure 15:
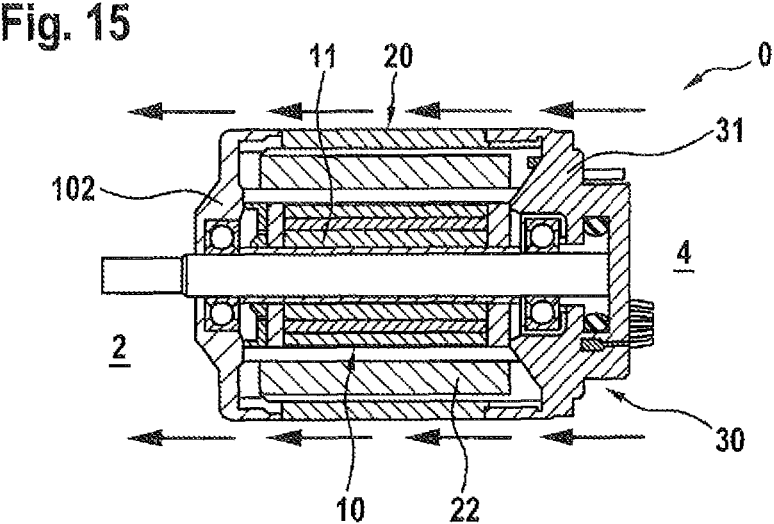
FIG. 15 shows a side view with a central section of a cooling system of the full-cartridge motor over the outer side of its stator.

Exemplary embodiments of a cooling system according to the disclosure for the electric motor 0 are explained in more detail below. The explanations in this case in particular relate to a full-cartridge motor 0, but can be used analogously for a half-cartridge motor 0.—FIG. 15, as well as FIG. 1 to FIG. 14, show a completely encapsulated electric motor 0, i.e. as can be seen in FIG. 15, an air flow cools exclusively over an outer side or the outer faces of the stator module 20 or the stator body 21. The stator module 20 and the rotor module 10 are encapsulated by the end caps 31, 102. The electric motor 0 is in the form of a closed motor 0 and is very well suited for use in a contaminated environment.

Figure 16:
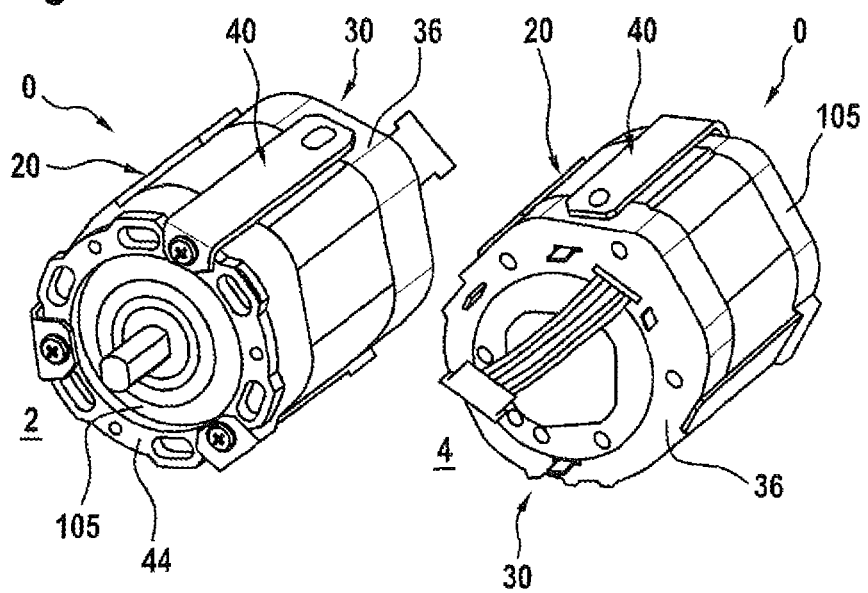
FIG. 16 shows a perspective front and rear view of a full-cartridge motor which has been modified in accordance with the disclosure for cooling and can be cooled over the outer side of its stator and the slots and turns in the stator.
Figure 17:
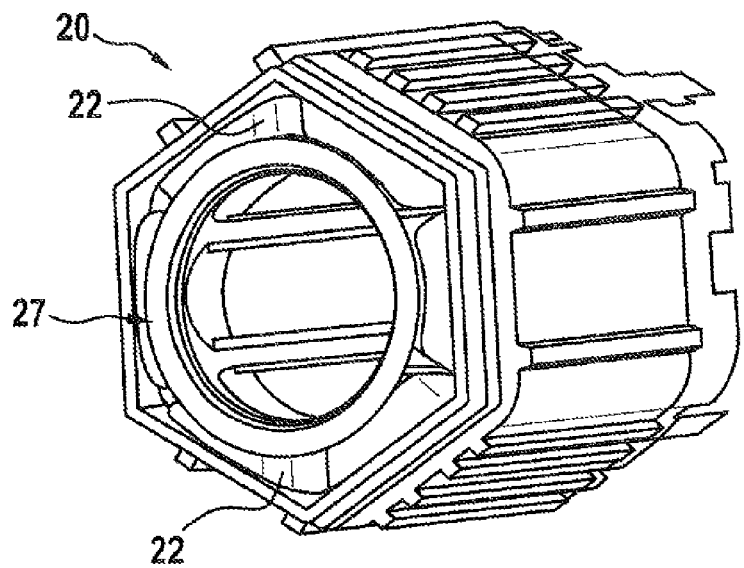
FIG. 17 shows a three-dimensional view of a stator module of the construction kit according to the disclosure having a slot seal.
Figure 18:
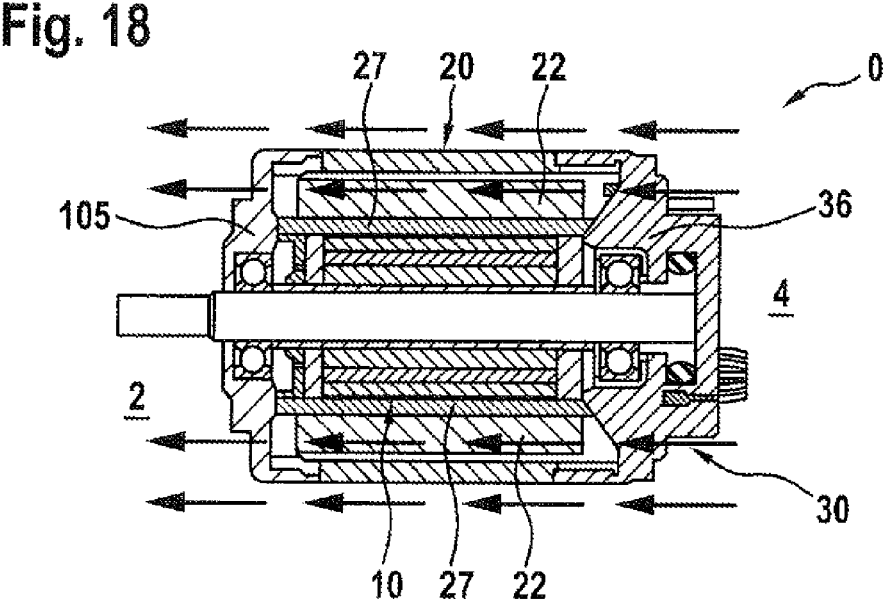
FIG. 18 shows a side view with a central section of a cooling system of the full-cartridge motor shown in FIG. 16 using the stator module having a slot seal shown in FIG. 17.

FIG. 16 to FIG. 18 show, in contrast to the above, a stator module 20 through which a flow passes or a stator body 21 through which a flow passes, i.e. a copper winding 22, a primary heat source of the electric motor 0, and the slots of the stator module 20, i.e. the inner faces of the laminate stack 21 are likewise possibly directly in the air flow. For this purpose, changed end caps 36, 105 and a changed sheet-metal ring 44 are required, which have at least one opening for the air flow. The rotor module 10 or the rotor body 11 are in this case not in the air flow and is/are encapsulated by an additional component part, a slot seal 27 of the stator module 20 (see FIG. 17). The electric motor 0 is in this case in the form of an open motor 0.

The slot seal 27 on/in the stator module 20 or stator body 21 seals the slots of the stator module 20 by means of webs and preferably seals by means of a tongue-and-groove geometry or an overlap with respect to the end caps 36, 105. By virtue of the encapsulation of the stator module 20, the rotor module 10 and an air gap between the rotor body 11 and the stator body 21 are protected from contamination, such as dust, for example. By virtue of the permanent magnets 12 in the rotor module 10, this is a significant advantage primarily when using the electric motor 0 in areas with iron-containing dust. Protection against abrasive dust, precisely at the movable parts of the electric motor 0, thus also has a positive influence on the service life.

Figure 19:
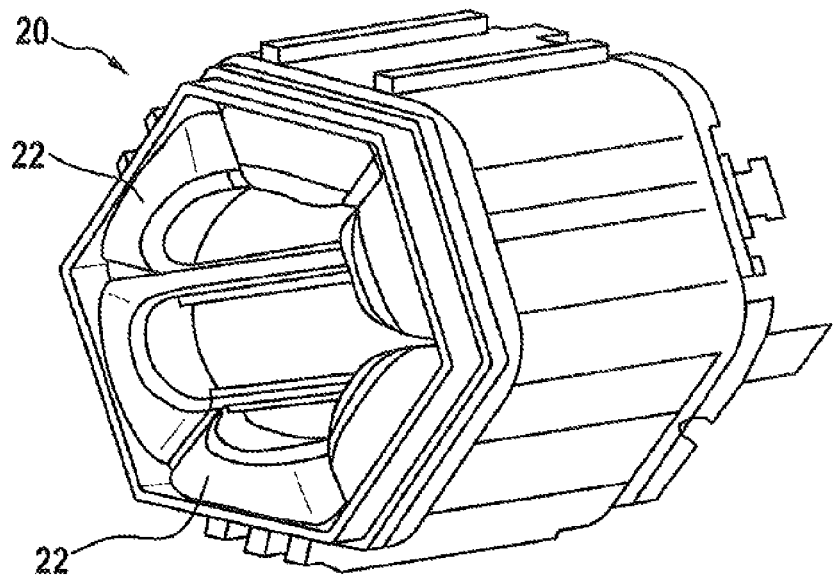
FIG. 19 shows a three-dimensional view of the stator module of the construction kit shown in FIG. 17 with no slot seal.
Figure 20:
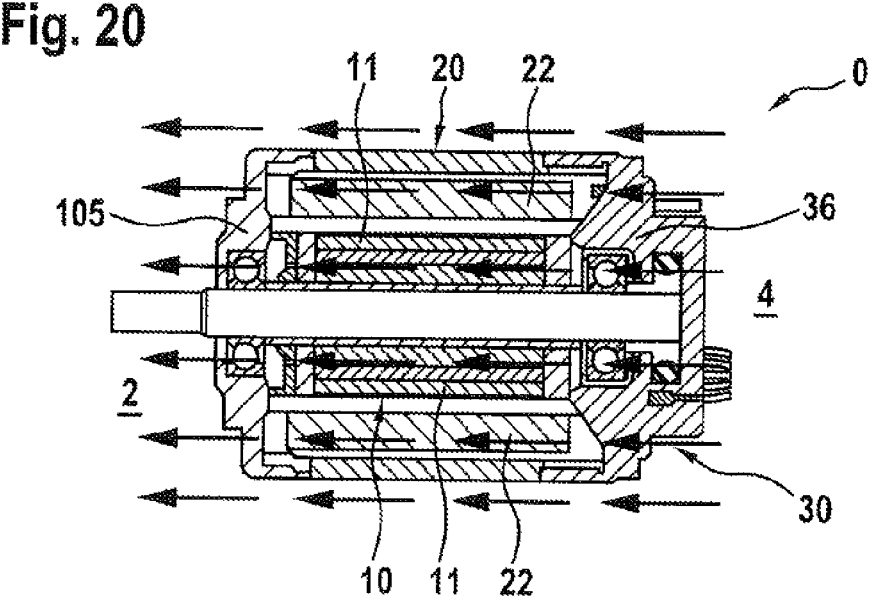
FIG. 20 shows a side view with a central section of a cooling system of the full-cartridge motor shown in FIG. 16 using the stator module without a slot seal shown in FIG. 19 for additional cooling of the rotor module.
Figure 21:
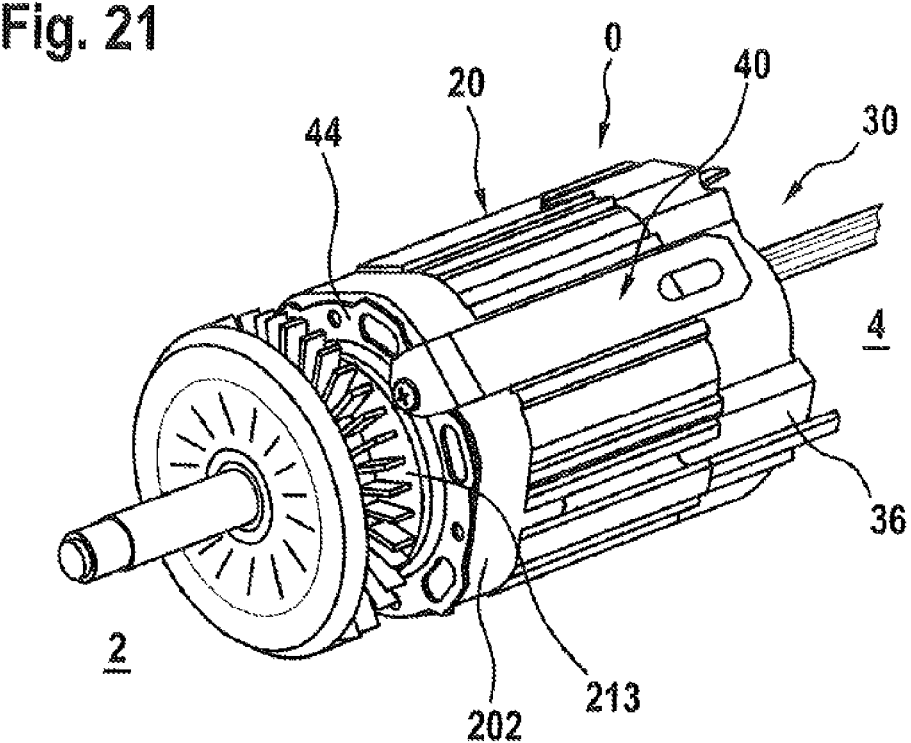
FIG. 21 shows a use of a cooling system according to the disclosure on an electric motor in the form of a half-cartridge motor.

FIG. 19 and FIG. 20 show an electric motor 0 in the form of an open motor 0 which has a flow completely passing through it. In contrast to FIG. 16 to FIG. 18, in this case the rotor module 10 is also in the air flow (FIG. 20), i.e. the component part comprising the slot seal 27 is dispensed with. The other component parts can be used identically, wherein, in a configuration of a half-cartridge motor 0, in this case the labyrinth disk can also be dispensed with (not FIG. 21). In this configuration, the best cooling and therefore the greatest power according to standard measurements are to be expected.—In addition, FIG. 21 shows a configuration as a half-cartridge motor 0 similar to that in FIG. 16 to FIG. 18.

LIST OF REFERENCE SYMBOLS

0 Electric motor, electric motor module, EC motor—preferably either 1.) electric motor in the form of a so-called full-cartridge motor, i.e. closed-frame concept, or 2.) electric motor in the form of a so-called half-cartridge motor, i.e. open-frame concept; and again preferably either (1a), (2a) electric motor in the form of a closed motor (cooling only external) or 1b), 2b) electric motor in the form of an open motor (cooling external and internal)
2 Output-drive side of electric motor 0
4 Non-output-drive side, sensor side of electric motor 0, non-output-drive side, sensor side
10 Module: rotor, rotor module
11 Carry-over part: rotor body, laminate stack
12 Carry-over part: (permanent) magnet, preferably four per laminate stack 11
13 Carry-over part: balancing disk, balancing plate preferably two per laminate stack 11, possibly different
14 Carry-over part: etc.
20 Module: stator, stator module
21 Carry-over part: stator body, laminate stack
22 Carry-over part: winding(s) with slot insulation, copper winding(s)
23 Carry-over part: end plate
24 Carry-over part: connecting plate, end plate
25 Carry-over part: electrical connection
26 Carry-over part: Y connection for radio interference suppression
27 Carry-over part: etc., for example possibly slot-seal for air flow insulation of the rotor module 10
30 Module: bearing arrangement, frame module, module: stator end cap, stator end cap module
31 Carry-over part: end cap, stator end cap
32 Carry-over part: armature bearing sensor side
33 Carry-over part: (rubber) cap
34 Carry-over part: magnet wheel
35 Carry-over part: sensor circuit board
36 Carry-over part: etc., for example possibly changed end cap with opening(s) for cooling (then carry-over part 31 is missing)
40 Module: fastening device, fastening module
41 Carry-over part: tensioning element, strut, sheet-metal bent part, spoke, cable (metal, plastic), preferably three per fastening module 40
42 Carry-over part: force introduction element, threaded pin, tensioning element, clamping element, clamping ring
43 Carry-over part: ring, in particular sheet-metal ring, plain washer
44 Carry-over part: etc., for example possibly changed ring with opening(s) for cooling (then carry-over part 41 is missing)
100 Assembly: Armature shaft including rotor module 10 for full-cartridge motor 0, armature shaft assembly
101 Individual part: armature shaft, rotor shaft
102 Individual part: end cap
103 Individual part: armature bearing output drive side, preferably injection-molded
104 Individual part: insulator, insulating layer, possibly designed as carry-over part (cf. item 214)
105 Individual part: etc., for example possibly changed end cap with opening(s) for cooling (then carry-over part 102 is missing)
200 Assembly: stator including stator module 20, frame module 30 and fastening module 40 for half-cartridge motor 0, stator assembly
201 Individual part: end cap
202 Individual part: etc., for example possibly changed end cap with opening(s) for cooling (then carry-over part 201 is missing)
210 Assembly: armature shaft including rotor module 10 for half-cartridge motor 0, armature shaft assembly
211 Individual part: armature shaft, rotor shaft
212 Individual part: fan
213 Individual part: sealing element, labyrinth disk (not for electric motors 0 having a flow completely passing through), shaft sealing ring
214 Individual part: insulator, insulating layer, possibly designed as carry-over part (cf. item 104)
215 Individual part: etc.

What is claimed is:

1. An electric motor construction kit for assembling a plurality of electric motors, comprising: at least one module including: a rotor module having a rotor body, a magnet, and/or a balancing disk; a stator module having a stator body, a winding having slot insulation, an end plate, a connecting plate, an electrical connection, a connection for radio interference suppression, and/or a slot seal; a fastening module having a tensioning element, a force introduction element, a first ring and/or a second ring having an opening for cooling; and a frame module having a first end cap, an armature bearing, a cap, a magnet wheel, a sensor circuit board, and/or a second end cap having an opening for cooling, and configured for mounting an armature shaft of an electric motor of the plurality of electric motors, and the frame module is configured such that both a first armature shaft of a first configuration or a first type of electric motor and a second armature shaft of a second configuration or a second type of electric motor can be mounted with the frame module; and a plurality of assemblies configured for constructing the plurality of electric motors, at least one assembly of the plurality of assemblies including one or more modules of the at least one module, wherein the at least one module does not include a cooling system of an electric motor of the plurality of electric motors, wherein each module of the at least one module is constructed from carry-over parts, and wherein any electric motor configured for construction with the electric motor construction kit includes the rotor module, the stator module, and/or the fastening module.

2. The electric motor construction kit according to claim 1, wherein: the at least one assembly includes at least one first individual part for at least one specific configuration or one specific type of electric motor configured to be constructed from the electric motor construction kit; and the at least one individual part, together with the one or more module of the at least one module, forms the at least one assembly.

3. The electric motor construction kit according to claim 1, wherein: a first non-output drive side of at least one specific configuration or one specific type of electric motor configured to be constructed from the electric motor construction kit and a second non-output drive side of at least one further specific configuration or one further specific type of electric motor configured to be constructed from the electric motor construction kit are identical; and/or a first output drive side of the at least one specific configuration or one specific type of electric motor configured to be constructed from the electric motor construction kit and a second output drive side of the at least one further specific configuration or one further specific type of electric motor configured to be constructed from the electric motor construction kit are configured such that a multiplicity of individual parts is provided.

4. The electric motor construction kit according to claim 1, wherein an electric motor of the plurality of electric motors is configured to be included in a handheld electric tool.

5. The electric motor construction kit according to claim 4, wherein the handheld electric tool is one of an electric screwdriver, an electric drill, an electric saw, an electric grinding machine, and an electric gardening appliance.

6. The electric motor construction kit according to claim 1, wherein the first configuration or first type of electric motor and the second configuration or second type of electric motor are electronically commutatable electric motors or electronically commutatable electric motors of different types.

7. The electric motor construction kit according to claim 1, wherein: the bearing is disposed on a non-output drive side of an electric motor of the plurality of electric motors and an end cap disposed substantially directly on the stator module; and the rotor module is mounted in the end cap.

8. The electric motor construction kit according to claim 7, wherein the frame module further includes a further rolling-contact bearing disposed on an output-drive side of an electric motor of the plurality of electric motors.

9. An electric motor construction kit for assembling a plurality of electric motors, comprising: at least one module including: a rotor module; a stator module; a fastening module; a frame module configured for mounting an armature shaft of an electric motor of the plurality of electric motors, and the frame module is configured such that both a first armature shaft of a first configuration or a first type of electric motor and a second armature shaft of a second configuration or a second type of electric motor can be mounted with the frame module; and a plurality of assemblies configured for constructing the plurality of electric motors, at least one assembly of the plurality of assemblies including one or more modules of the at least one module, wherein the at least one module does not include a cooling system of an electric motor of the plurality of electric motors, wherein each module of the at least one module is constructed from carry-over parts, wherein any electric motor configured for construction with the electric motor construction kit includes the rotor module, the stator module, and/or the fastening module, wherein, for cooling an electric motor of the plurality of electric motors, (i) a changed end cap having an opening is used as a carry-over part in the frame module, (ii) a changed ring having an opening is used as a carry-over part in the fastening module, and/or (iii) a changed end cap having an opening is used as an individual part, and wherein the stator module includes a slot seal.

10. The electric motor construction kit according to claim 9, wherein: the at least one assembly includes at least one first individual part for at least one specific configuration or one specific type of electric motor configured to be constructed from the electric motor construction kit; and the at least one individual part, together with the one or more module of the at least one module, forms the at least one assembly.

11. The electric motor construction kit according to claim 9, wherein: a first non-output drive side of at least one specific configuration or one specific type of electric motor configured to be constructed from the electric motor construction kit and a second non-output drive side of at least one further specific configuration or one further specific type of electric motor configured to be constructed from the electric motor construction kit are identical;

and/or a first output drive side of the at least one specific configuration or one specific type of electric motor configured to be constructed from the electric motor construction kit and a second output drive side of the at least one further specific configuration or one further specific type of electric motor configured to be constructed from the electric motor construction kit are configured such that a multiplicity of individual parts is provided.

12. The electric motor construction kit according to claim 9, wherein the open frame electric motor and the closed frame electric motor are configured to be included in a handheld electric tool.

13. The electric motor construction kit according to claim 12, wherein the handheld electric tool is one of an electric screwdriver, an electric drill, an electric saw, an electric grinding machine, and an electric gardening appliance.

14. The electric motor construction kit according to claim 9, wherein the first configuration or first type of electric motor and the second configuration or second type of electric motor are electronically commutatable electric motors or electronically commutatable electric motors of different types.

15. The electric motor construction kit according to claim 9, wherein: the bearing is disposed on a non-output drive side of an electric motor of the plurality of electric motors and an end cap disposed substantially directly on the stator module; and the rotor module is mounted in the end cap.

16. The electric motor construction kit according to claim 15, wherein the frame module further includes a further rolling-contact bearing disposed on an output-drive side of an electric motor of the plurality of electric motors.

\* \* \* \* \*